United States Patent [19] [11] Patent Number: 4,872,006
Takao [45] Date of Patent: Oct. 3, 1989

[54] DATA TRANSMISSION SYSTEM

[75] Inventor: Mitsuji Takao, Tokyo, Japan

[73] Assignee: Canon Kabushiki Kaisha, Tokyo, Japan

[21] Appl. No.: 323,122

[22] Filed: Mar. 13, 1989

Related U.S. Application Data

[63] Continuation of Ser. No. 57,651, Jun. 8, 1987, abandoned, which is a continuation of Ser. No. 615,548, May 31, 1984, abandoned.

[30] Foreign Application Priority Data

Jun. 10, 1983 [JP] Japan ................................. 58-102743
Jun. 10, 1983 [JP] Japan ................................. 58-102778

[51] Int. Cl.⁴ .................... H04L 7/02; H04Q 5/00; H04Q 9/04
[52] U.S. Cl. ..................... 340/825.52; 340/825.07; 340/825.21; 370/101; 370/92; 375/117
[58] Field of Search ........ 340/825.52, 825.47, 340/825.07, 825.2, 825.21; 370/32, 60, 92, 94, 110.1, 82, 84, 85, 48, 49, 101; 375/117

[56] References Cited

U.S. PATENT DOCUMENTS

| | | | |
|---|---|---|---|
| 3,882,465 | 5/1975 | Cook et al. | 340/825.21 |
| 4,052,566 | 10/1977 | MacKay | 370/101 |
| 4,052,567 | 10/1977 | MacKay | 370/101 |
| 4,131,881 | 12/1978 | Robinson | 340/825.47 |
| 4,199,663 | 4/1980 | Herzog | 370/85 |
| 4,410,889 | 10/1983 | Bryant et al. | 340/825.2 |
| 4,451,827 | 5/1984 | Kahn et al. | 340/825.52 |
| 4,476,559 | 10/1984 | Brolin et al. | 370/110.1 |
| 4,516,122 | 5/1985 | Tomikawa | 340/825.52 |
| 4,779,092 | 10/1988 | Takao | 340/825.52 |

Primary Examiner—Robert L. Griffin
Assistant Examiner—Ralph E. Smith
Attorney, Agent, or Firm—Fitzpatrick, Cella, Harper & Scinto

[57] ABSTRACT

There is disclosed a data transmission system in which data are transmitted among plural stations. The system is capable of transmitting data of different rates of formats. The relationship of different sets of data is indicated by the time interval between the sets, and the interval is selected longer than a predetermined value if the sets of data are mutually irrelevant.

11 Claims, 4 Drawing Sheets

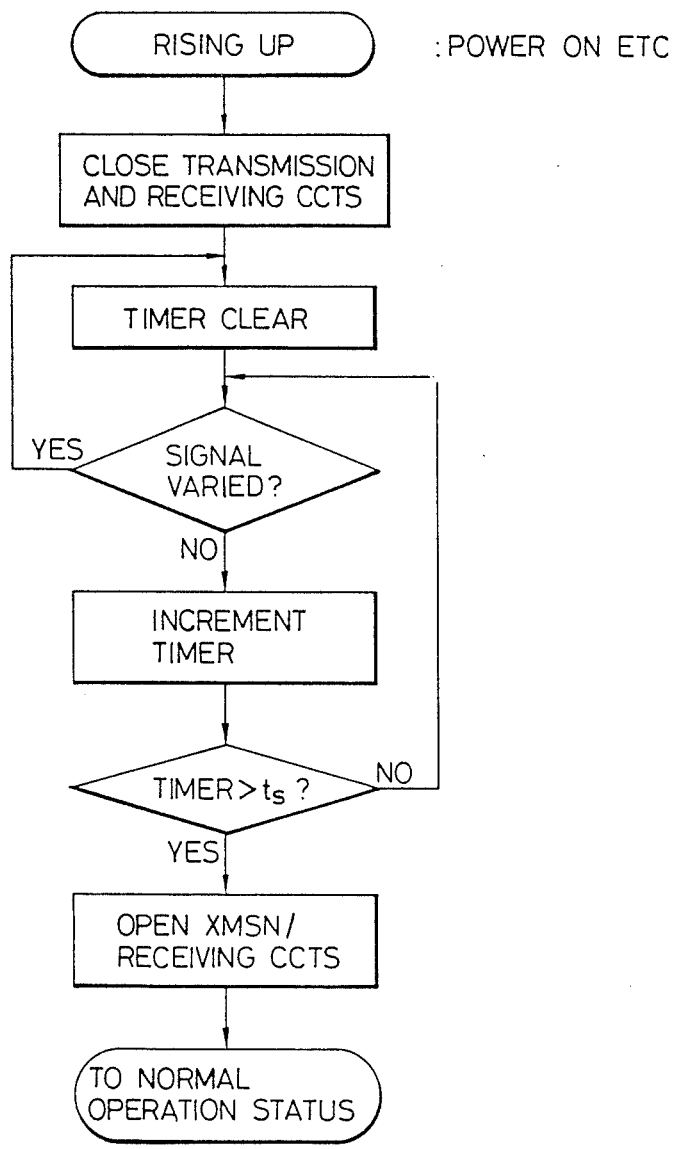

DATA TRANSMISSION SYSTEM

This application is a continuation of application Ser. No. 057,651, filed June 8, 1987, now abandoned, which in turn is a continuation of application Ser. No. 615,548, filed May 31, 1984, now abandoned.

BACKGROUND OF THE INVENTION

5. Field of the Invention

The present invention relates to a data transmission system for data transmission among plural stations, and more particularly to a data transmission system adapted for use in a local area network.

2. Description of the Prior Art

Recent progress in office automation has stimulated the development of a communication network in a limited area suitable for data transmission among various office equipment, which is usually called a local area network (LAN). In a conventional local area network the data transfer rate and data format in the transmission channel are fixed. Therefore, in the case of connecting an unmatched terminal to the network, it becomes necessary to provide matching means such as a data buffer for matching with the transfer rate of the network or means for converting the data format, and such requirements lead to a more complicated structure and increased cost.

In order to avoid the above-mentioned drawbacks the present applicant already disclosed, in a patent application Ser. No. 521,831 for a Data Communication Method, filed Aug. 10, 1983 by the present inventor, a communication network system in which each station can transmit data having an arbitrary format with an arbitrary transfer rate, without any hardware for transfer rate matching or for data format conversion. More specifically, in the system of said patent application, data transmitted through the network are classified into two categories; one being protocol data of a fixed data format and of a base rate at which the protocol functions, and the other being special data for data transmission which are of an undefined data format and of an arbitrary rate to be determined by the ability of the terminal. The transmission of said special data through the transmission channel is always preceded by a communication control command by said protocol data which informs all the nodes or stations in the entire network of such transmission.

The above-identified patent application describes a process in the stationary state of a so-called network in which stations and network are both ready for communication and control by protocol is effective. In the actual network system, however, in addition to the above-described process in the stationary state, there is required a so-called synchronizing process for activating a station and synchronizing the same with the communication sequence already in progress in the network, thus realizing the above-mentioned stationary state, and there is usually required means for this purpose separate from the network control protocol.

In the conventional network, the transmitted data has a predetermined data format and a transfer rate similar to the aforementioned protocol data, in which special flag codes or synchronization signals indicate the start and end of the effective data in the flag areas in front of and behind the data as in the high-level data link format (HDLC) shown in FIG. 1. In the conventional network, for the purpose of achieving the synchronization to the communication sequence, an exclusive discriminating circuit is utilized to discriminate these identification codes at a determined frequency, thereby detecting the junctions between the transmitted data and enabling the reception or transmission of data after said detection.

However, such a conventional synchronizing method cannot be merely applied to the network system in which, as described in the aforementioned patent application, data of different speeds and different formats (quantities, modulating methods etc.) such as image data are mixed, since such data of different speeds and different formats may contain codes or signals which are the same as or are mistaken by the discriminating circuit as the identification codes.

Such a local area network employs only one communication line for cost reduction, and the characterization of the data in said communication line is achieved not by a special auxiliary signal line but by so-called protocol.

Protocol in communication means a common understanding among all the stations in the network according to which all the stations interpret the transmitted data, and, in this manner the transmitted data composed of a group of bits can have definite meaning.

In the following there will be given an explanation on the conventional mechanism of data transmission and reception.

In most cases, the data transmitted in the local area network is associated with a receiver address code and a transmitter address code.

The receiver address code is used for determining the receiving station of the transmitted data.

More specifically, the data transmitted to the communication channel are equally received by all the stations, except the transmitting station, in the network, and the receiver address code is checked. The data are accepted by a station whose station address coincides with said receiver address.

On the other hand, the transmitter address represents the address of the transmitting station, and is utilized for making a response from the receiving station of the transmitted data, but the frequency of utilization is apparently less than that of the receiver address.

In the conventional system, each data are associated with only one receiver address, and the communication is made in so-called one-to-one type in which data can be transferred to only one station in one communication.

Consequently, a complicated control procedure is required in one-to-plural type communication.

SUMMARY OF THE INVENTION

In consideration of the foregoing, an object of the present invention is to provide a data transmission system capable of smooth data communication.

Another object of the present invention is to provide a data transmission system adapted for use in a local area network.

Still another object of the present invention is to provide a data transmission system capable of appropriate synchronization of a node (station) at the start-up thereof, in a network for mixed transmission of two different data, namely, network control protocol data of a fixed data rate and a fixed data format and data of an arbitrary data rate and an arbitrary data format, such as image data.

Still another object of the present invention is to provide a data transmission system capable of secure synchronization by detecting, instead of a conventional identification element composed of special codes or pattern signals which can be easily misinterpreted, a non-signal state in which data are absent in the transmission channel as the identification element thereby starting the data transmission to the network or the data reception therefrom.

Still another object of the present invention is to provide a data transmission system adapted for use in a network for transmitting different types of data such as code data and dot data.

It is another object of the present invention to provide a data transmission system capable of efficiently achieving one-to-plural type data communication, namely transmission of same data to plural stations.

Yet another object of the present invention is to provide a data transmission system capable of transmission of the same data to plural stations through a very simple protocol in which the transmitter address is utilized in determining whether a receiving station accepts the transmitted data.

The foregoing and still other objects of the present invention, and the effects thereof, will become fully apparent from the following description.

BRIEF DESCRIPTION OF THE DRAWINGS

FIGS. 4 and 5 are flow charts of a communication control firmware;

DETAILED DESCRIPTION OF THE INVENTION

Now, the present invention will be explained in detailed by an embodiment shown in the attached drawings.

Figure 1:
FIG. 1 is a format chart showing an example of the HDLC format for serial communication data employed in the conventional network system.
Figure 2:
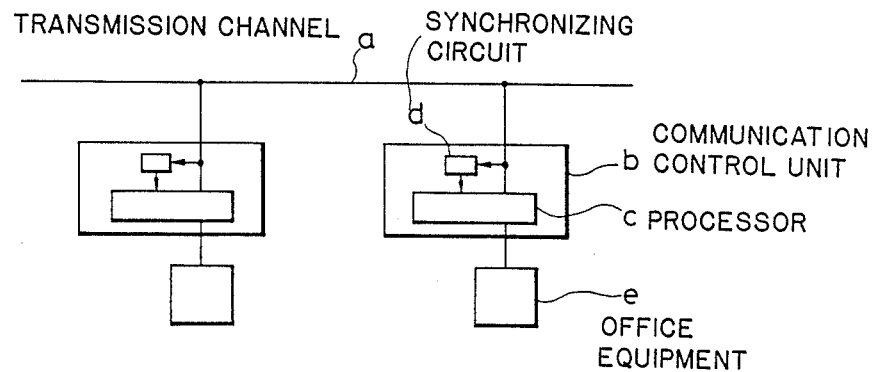
FIG. 2 is a block diagram showing an embodiment of a network system utilizing the synchronizing device of the present invention.

FIG. 2 shows an embodiment of a communication network utilizing the synchronizing device of the present invention, wherein shown are a network transmission channel a composed, for example, of an optical fiber or a metal wire, and a communication control unit (station) b for data communication, with data of varied kinds such as code data and dot data, with other communication control units through the transmission channel a. Each communication control unit b is provided with a processor c composed, for example, of a microcomputer operated with a communication control firmware, and a synchronizing circuit (synchronization signal discriminating circuit) d composed for example of a one-shot multivibrator circuit for identifying whether data are present on the transmission channel a, i.e., for identifying the presence of change in the data signal on the channel a. The communication control unit b is connected to an office equipment e such as a reader unit for photoelectrically reading an image, a printer unit for image recording in response to image signals, a word processor or an office computer, whereby said equipment e transmits or receives data to or from the network through the communication control unit b.

The communication control unit b has a function of varying the interval of transmission of data p in the data transmission through the communication control firmware. More specifically, in order to provide a station in the start-up stage with a suitable timing for synchronization, the time interval to the start of transmission of next data p at an intersection of communication sequence can be prolonged or shortened.

Figure 3:
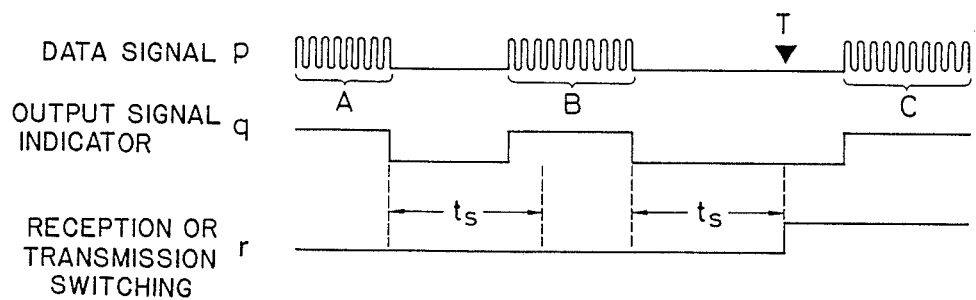
FIG. 3 is a timing chart showing an example of signal wave forms at the synchronizing process in the device shown in FIG. 2.

Let us take an example, shown in FIG. 3, that a station in the network transmits data A, B and C. It is assumed that the data B alone are special data, for example image data, and are related with the preceding data A in such a manner that the nature and format of data B cannot be understood by the reception on said data B alone but by the reception of said preceding data A which are control data for the succeeding image data. The time interval between such mutually related data A and B is selected shorter than a determined time $t_s$. It is also assumed that the data C are not related with the preceding data B and can be interpreted independently. Such data C are transmitted with an interval in excess of said determined time $t_s$ from the end of the data B.

Such rule, if understood by all the stations in the network, identifies the end of a communication sequence or the relationship of neighboring data from the identification whether the interval between data exceeds the time $t_s$ or not.

Figure 4:
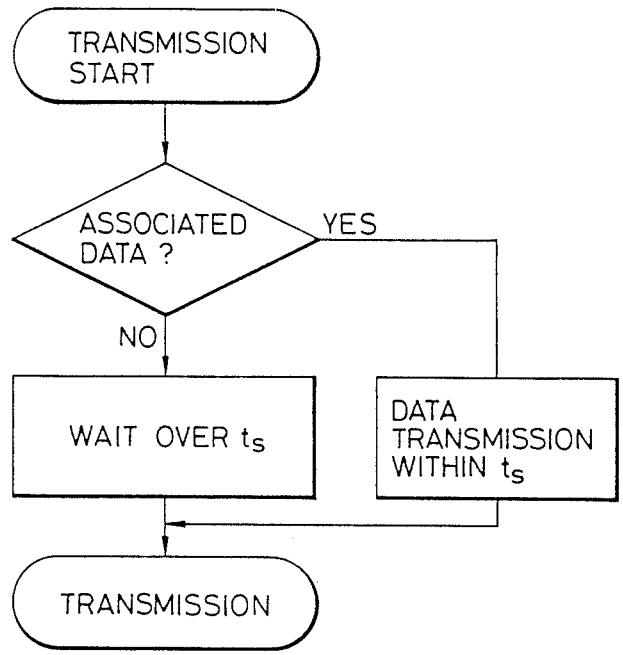

FIG. 4 shows an example of the flow chart for the transmitting operation.

A transmitting station transmits data before a timer, incorporated in the communication control unit a, counts said time $t_2$ if said data are related with the preceding data. On the other hand, if the data are not related, the data transmission is effected after said incorporated timer has counted said time $t_s$. The control along the flow chart shown in FIG. 4 is executed by the processor c in the communication control device according to a previously stored program.

Now, there will be explained an example of the synchronizing operation of a station in the start-up state while making reference to the signal wave form chart shown in FIG. 3 and the flow chart shown in FIG. 5.

The data signal p on the transmission channel a is entered into the synchronizing circuit d, and an output signal g indicating the presence or absence of change in the data signal p is generated by suitable means such as a one-shot multivibrator. Said output signal g is entered for example from an I/O port of the processor c and is transmitted to the firmware therein.

The processor c of the station b immediately after the start-up continuously inspects the output signal g of the synchronizing circuit d, and measures the time after the termination of the signal p on the transmission channel a, namely, after the end of the output signal g of the synchronizing circuit d. If the signal p does not appear on the transmission channel a even after the lapse of a predetermined time $t_s$, the processor c identifies that the timing for the aforementioned synchronization has reached and switches the circuit for the data reception or data transmission (r) from said timing T, thus completing the synchronizing process.

As the station b already in the communicating operation can vary the interval of the data p in the above-described manner, said variation in the interval can be utilized for selecting a timing suitable for synchronization of another station b which is in the start-up stage and is not yet synchronized to the system. It is therefore rendered possible to securely achieve synchronization in a network for transmitting, as explained before, the data of arbitrary transfer rate and of arbitrary data format as well as the protocol data of a fixed base transfer rate and a fixed data format, particularly a network for transmitting a large quantity of image data. As an example, if the aforementioned synchronizing interval $t_s$ is provided before the transmission of the protocol data of the base transfer rate and of the fixed format, a station b after the start-up stage will always meet, at first, such protocol data of known transfer rate and format, so that the received data can always be interpreted according to a determined rule. Also by placing said synchronizing interval $t_s$ at the end of a communication sequence, it is rendered possible to achieve synchronization at the start of a new communication sequence and to dispense with the skip process required in case the synchronization is reached in the course of a communication sequence.

As explained in the foregoing, the measurement of vacant interval between the data signals is employed as the synchronization signal instead of the conventional synchronizing codes or signals involving the danger of misinterpretation, thus enabling synchronization of data of arbitrary transfer rate and arbitrary data format. Thus, the present invention provides a significant advantage of relieving each station or communication control unit thereof from the obligation to match the transmitted data with the fixed transfer rate and data format in the conventional network. Also, there is obtained an additional advantage that the control is achievable very inexpensively as it requires quite limited hardware such as one-shot multivibrators and is mostly realized by firmware.

In case of transmitting data of different natures, such as code data and dot data, through a same transmission channel, such data are usually preceded by a signal indicating the data format of the succeeding data so that the appropriate data processing is made possible only by receiving said signal. However, the present invention allows secure receipt of the format-indicating signal, and thus avoiding the inconvenience of mistaking the code data or dot data for the control data.

Now there will be given an explanation on the same message transmission in which the same data are delivered to plural stations in one communication.

Figure 6:
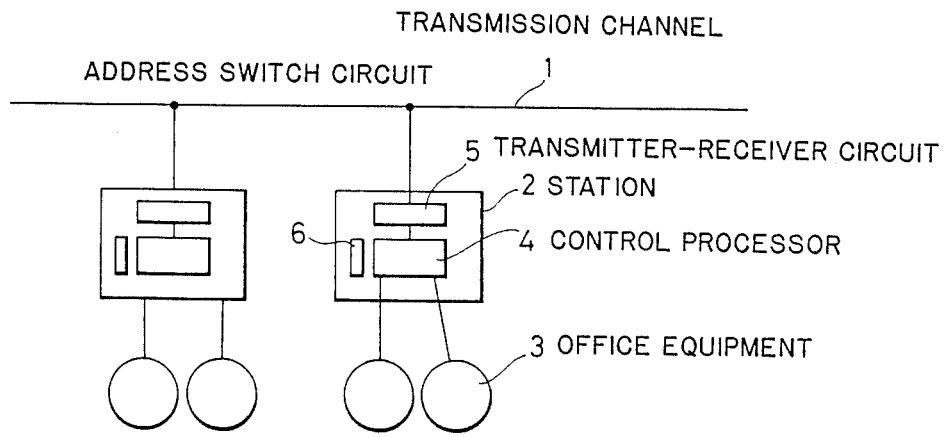
FIG. 6 is a block diagram of other hardware stations.

FIG. 6 shows the hardware structure in which a network transmission channel 1 is connected to plural stations 2, each of which connected to an office equipment unit 3.

Station 2 is provided with a communication control processor 4 for controlling the communication operation according to the network protocol and effecting data exchange between the transmission channel 1 and the respective equipment unit 3; a transmitter-receiver circuit 5; and an address switch circuit 6.

The address switch circuit 6 has a code specific to each station, which is made known, for example, through an I/O port, to a communication control firmware of the communication control processor and is utilized as so-called transmitter or receiver address.

In the present embodiment the communication is not always conducted in the same message communication from one-to-plural stations but is normally conducted in the above-described communication from one-to-one stations. The form of communication is switched, by a communication control command, to the one-to-plural same-message communication when a requirement for such communication arises, and, upon completion thereof, the one-to-one communication is restored by another communication control command.

The above-mentioned shift from the one-to-one communication mode to the one-to-plural communication mode is achieved by a communication control command, which is hereinafter called the set broadcasting mode (SBM) command.

Also in the present embodiment the shift from the one-to-plural communication mode to the one-to-one communication mode is achieved by a second communication control command, which is hereinafter called the reset broadcasting mode (RBM) command.

These communication control commands are also a kind of communication data and are the same as other data with respect to the data format and the procedure of determining the acceptance through the comparison of addresses.

The outlined procedure in response to the above-mentioned SBM and RBM commands is as follows:

(1) A station receiving the SBM command accepts any succeeding data of a transmitter address the same as that in said command, regardless of the receiver address of said data. Such stage is called the broadcasting mode.

Thus, in case the same message communication is required, an SBM command is set to each of the plural stations intended to be as receivers, and the message data are then transmitted with the same transmitter address as that in the SBM command.

Consequently, the data are received, regardless of the receiver address, by all the stations intended as receivers of the same message communication.

The broadcasting mode can be memorized as a flag in the communication control firmware of each station, and is not reset until the reception of an RBM command to be explained in the following.

Thus, the same message communication can be repeated any number of times with any data once said broadcasting mode is established.

(2) The broadcasting mode is cancelled upon reception of an RBM command, whereby restored is the one-to-one communication mode in which the transmitted data are accepted only when the receiver address thereof coincides with the station address.

As explained in the foregoing, the same message communication can be realized with a simple mechanism. The above-described operation will be explained in more detail.

Figure 7:
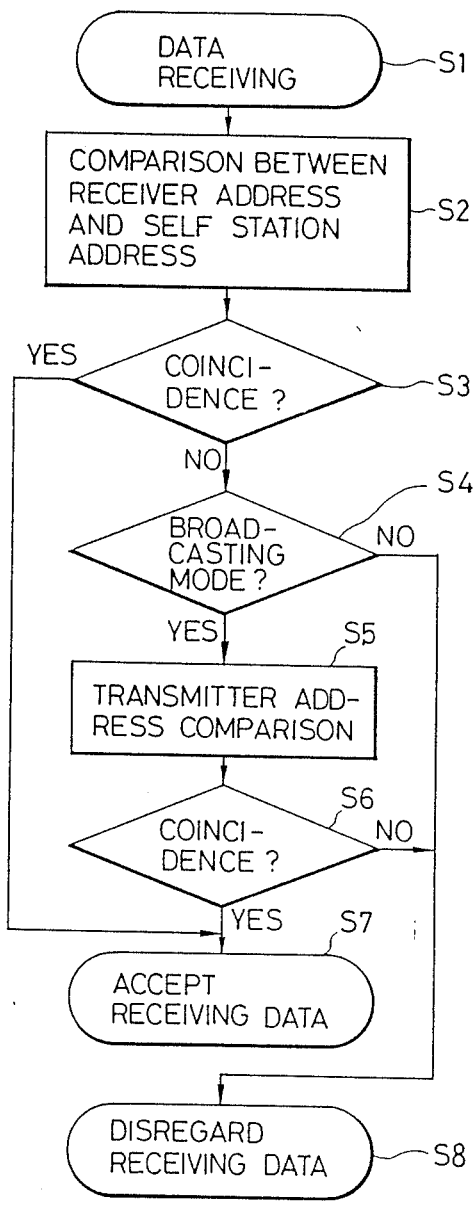
FIG. 7 is a flow chart showing the control function of the system shown in FIG. 6.

FIG. 7 shows a flow chart of the procedure to be executed in the receiving station in the foregoing embodiment, wherein the receiving station receives, in a step S1, data from the transmitting station. A step S2 compares the receiver address attached in the received data with the address of the receiving station. A step S3 discriminates whether the addresses mutually coincide in the comparison of the step S2, and, in case of coincidence, the program jumps to a step S7 for accepting the received data. On the other hand, in case of absence of coincidence, the program proceeds to a step S4 in order to determine whether or not to accept the received data.

The step S4 checks whether the broadcasting mode has been established by an earlier reception of an SBM command from the transmitter of the received data. If the broadcasting mode has not been established, it is now clear that the received data are not directed to this receiving station, so that the program jumps to a step S8 to ignore the received data. On the other hand, if the broadcasting mode has been established, the program proceeds to a step S5 for further processing.

The step S5 compares the transmitter address of the received data with the transmitter address of the SBM command.

The step S6 discriminates the presence of coincidence in the comparison of step S5. In case said addresses do not mutually coincide, it is now clear that the received data are not addressed to this receiving station, so that the program jumps to a step S8 to disregard the received data. On the other hand, in case of coincidence of both addresses, corresponding to a case that the transmitter address of the received data coincides with that of the SBM command in the broadcasting mode, it is now clear that the received data are addressed to this receiving station so that the program proceeds to a step S7 for accepting the received data.

As explained in the foregoing, the present embodiment enables achieving the same message communication by the use of extremely simple communication control commands SBM and RBM.

In addition to resetting the broadcasting mode, said RBM command can be used for forming another set of stations for the same message communication, by sending the command to the stations which have not formed the group of same message communication.

In resetting the broadcasting mode in plural stations with the RBM command, it may be sent to said stations in the same manner as the transmission of the SBM command, but most efficiently the RBM command is sent with a transmitter address the same as that in the SBM command.

In this manner the broadcasting mode in all the stations receiving the same message can be cancelled, by means of the same message transmitting function, in one communication.

As explained in detail above, in addition to the one-to-one communication mode in which the receiving station is determined by the receiver address in the transmitted data, there is provided a method of determining the receiving station by the transmitter address in the transmitted data, thereby realizing the one-to-plural communication mode through the use of extremely simple and easily handled SBM and RBM communication control commands, with the possibility of easy and inexpensive firmware control.

The present invention is not limited to the preferred embodiments explained above but is subject to various modifications within the scope and spirit of the appended claims.

What I claim is:

1. A data transmission system for data transmission among called stations through a data transmission channel, each station comprising:
    means for generating plural sets of data to be transmitted;
    means for sequentially transmitting the plural sets of data generated from said generating means to the data transmission channel;
    means for controlling data transmission operation of said transmitting means, said control means being operable, if one set of data to be transmitted depends on another set of data which was previously transmitted, to cause said transmitting means to transmit the one set of data within a predetermined time after completion of transmission of said other set of data, and if the one set of data does not depend on the other set of data, to cause said transmitting means to transmit the one set of data after said predetermined time;
    means for measuring, in a start-up state of the respective station, a time in which, after completion of transmission of one set of data through the data transmission channel, another set of data is absent from the data transmission channel; and
    means for receiving a set of data from the data transmission channel, said receiving means being operable to initiate a receiving operation of the set of data after the time measured by said measuring means exceeds said predetermined 2. A data transmission system according to claim 1, wherein the sets of data have at least two different transfer rates or data formats.

3. A data transmission system according to claim 1, wherein said controlling means has means for discriminating whether or not the one set of data to be transmitted depends on the other set of data which was previously transmitted.

4. A data transmission system according to claim 1, further comprising means for identifying a break between the sets of data based on the time measured by said measuring means.

5. A data transmission system according to claim 4, wherein said identifying means is operable to identify whether or not two sets of data, which are sequentially transmitted through the data transmission channel, residue in a dependent relation therebetween based on a transmission time interval between the two sets of data sequentially transmitted through the data transmission channel.

6. A data transmission system according to claim 1, wherein said receiving means does not receive, before the time measured by said measuring means exceeds said predetermined time, the set of data transmitted through the data transmission channel.

7. A data transmission system for data transmission among plural stations, each having an associated address, through a data transmission channel, each station comprising:
    means for generating data to be transmitted;
    means for transmitting a set of data including the data generated from said generating means, upon providing each set of the data with a transmitter address representing a station as a transmitting source of a set of data and a receiver address representing a station as a receiving terminal of a set of data, through the data transmission channel; and
    means for receiving a set of data, in a normal operation mode, when a receiver address which is provided for the set of data being transmitted through the data transmission channel coincides with the address of such station,
    wherein said transmitting means is operable to transmit a communication control command with the transmitter address for instructing arbitrary plural other stations to perform an operation in a predetermined operation mode, and said receiving means is operable in the predetermined operation mode to receive a set of data, when the transmitter address which is provided for the set of data being transmitted through the data transmission channel coincides with an address of a station which has transmitted said communication control command.

8. A data transmission system according to claim 7, wherein said receiving means is operable in the predetermined operation mode to receive the set of data, even if the receiving address does not coincide with the address of such station.

9. A data transmission system according to claim 7, wherein the receiving means in each of plural stations in the predetermined operation are operable to simultaneously take in the set of data.

10. A data transmission system according to claim 7, wherein said receiving means has first determination means for determining whether or not a receiver address which is provided for the set of data coincides with the address of such station, and second determination means for determining whether or not a transmitter address which is provided for the set of data coincides with the address of a station which has transmitted said communication control command.

11. A data transmission system according to claim 7, wherein said transmitting means is operable to transmit a release command for releasing the predetermined operation mode.

* * * * *

UNITED STATES PATENT AND TRADEMARK OFFICE
CERTIFICATE OF CORRECTION

PATENT NO. : 4,872,006
DATED : October 3, 1989
INVENTOR(S) : MITSUJI TAKAO

It is certified that error appears in the above-identified patent and that said Letters Patent is hereby corrected as shown below:

COLUMN 8

Line 16, "predetermined" should read
--predetermined time.--.
Line 32, "resi-" should read --reside--.
Line 33, "due" should be deleted.

Signed and Sealed this

Twenty-eighth Day of January, 1992

Attest:

HARRY F. MANBECK, JR.

*Attesting Officer*   *Commissioner of Patents and Trademarks*